(12) United States Patent
Tian

(10) Patent No.: US 9,369,628 B2
(45) Date of Patent: *Jun. 14, 2016

(54) UTILIZING A SMART CAMERA SYSTEM FOR IMMERSIVE TELEPRESENCE

(71) Applicant: Cisco Technology, Inc., San Jose, CA (US)

(72) Inventor: Dihong Tian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/581,379

(22) Filed: Dec. 23, 2014

(65) Prior Publication Data

US 2015/0109402 A1    Apr. 23, 2015

Related U.S. Application Data

(63) Continuation of application No. 13/793,524, filed on Mar. 11, 2013, now Pat. No. 8,957,940.

(51) Int. Cl.
| | |
|---|---|
| *H04N 7/14* | (2006.01) |
| *H04N 5/232* | (2006.01) |
| *H04N 7/15* | (2006.01) |
| *H04N 5/247* | (2006.01) |
| *G06K 9/00* | (2006.01) |
| *H04N 5/262* | (2006.01) |

(52) U.S. Cl.
CPC ........ *H04N 5/23238* (2013.01); *G06K 9/00228* (2013.01); *H04N 5/23219* (2013.01); *H04N 5/23296* (2013.01); *H04N 5/247* (2013.01); *H04N 5/2621* (2013.01); *H04N 7/15* (2013.01)

(58) Field of Classification Search
CPC ......... H04N 7/15; H04N 7/147; H04N 7/141; H04N 7/157; H04N 7/14; H04N 7/142
USPC ..................... 348/14.01, 14.08, 14.12, 14.16
See application file for complete search history.

(56) References Cited

U.S. PATENT DOCUMENTS

| | | | |
|---|---|---|---|
| 5,778,082 | A | 7/1998 | Chu et al. |
| 5,852,669 | A | 12/1998 | Eleftheriadis et al. |
| 6,577,333 | B2 | 6/2003 | Tai et al. |
| 6,583,808 | B2 | 6/2003 | Boulanger et al. |
| 6,704,048 | B1 | 3/2004 | Malkin et al. |
| 6,795,558 | B2 | 9/2004 | Matsuo |
| 7,057,636 | B1 | 6/2006 | Cohen-Solal et al. |

(Continued)

FOREIGN PATENT DOCUMENTS

| | | |
|---|---|---|
| WO | 9416517 | 7/1994 |
| WO | 9906940 | 2/1999 |

(Continued)

*Primary Examiner* — Quoc D Tran
(74) *Attorney, Agent, or Firm* — Edell, Shapiro & Finnan, LLC

(57) ABSTRACT

Video content is received at a computing device including camera views provided by video cameras that are aligned to capture images of participants within a defined space. The video cameras are aligned such that a field of view (FOV) for each camera overlaps a portion of the FOV of at least one other adjacent camera. Positions of participants depicted within the video content are detected, where target views are generated to combine as a continuous view of the video content that includes the plurality of detected participants. The target views are displayed at display devices.

22 Claims, 13 Drawing Sheets

(56) References Cited

U.S. PATENT DOCUMENTS

| | | |
|---|---|---|
| 8,169,463 B2 | 5/2012 | Enstad et al. |
| 8,358,328 B2 | 1/2013 | Friel et al. |
| 8,957,940 B2* | 2/2015 | Tian .................. H04N 5/23296 348/14.01 |
| 2002/0023133 A1 | 2/2002 | Kato et al. |
| 2002/0140804 A1 | 10/2002 | Colmenarez et al. |
| 2002/0149672 A1 | 10/2002 | Clapp et al. |
| 2003/0103647 A1 | 6/2003 | Rui et al. |
| 2003/0193584 A1 | 10/2003 | Malkin et al. |
| 2004/0257432 A1 | 12/2004 | Girish et al. |
| 2004/0263636 A1 | 12/2004 | Cutler et al. |
| 2005/0129325 A1* | 6/2005 | Wu ....................... G06T 7/0022 382/254 |
| 2005/0237376 A1 | 10/2005 | Roessler et al. |
| 2007/0120971 A1 | 5/2007 | Kennedy |
| 2007/0279484 A1 | 12/2007 | Derocher et al. |
| 2008/0246833 A1 | 10/2008 | Yasui et al. |
| 2010/0245535 A1* | 9/2010 | Mauchly ............... G06T 7/0075 348/14.08 |
| 2012/0169842 A1 | 7/2012 | Chuang et al. |
| 2012/0314015 A1* | 12/2012 | Watson .................... H04N 7/15 348/14.1 |
| 2013/0010144 A1* | 1/2013 | Park ................. G08B 13/19641 348/218.1 |

FOREIGN PATENT DOCUMENTS

| | | |
|---|---|---|
| WO | 9960788 | 11/1999 |
| WO | 03043327 | 5/2003 |
| WO | 2008101117 | 8/2008 |

* cited by examiner

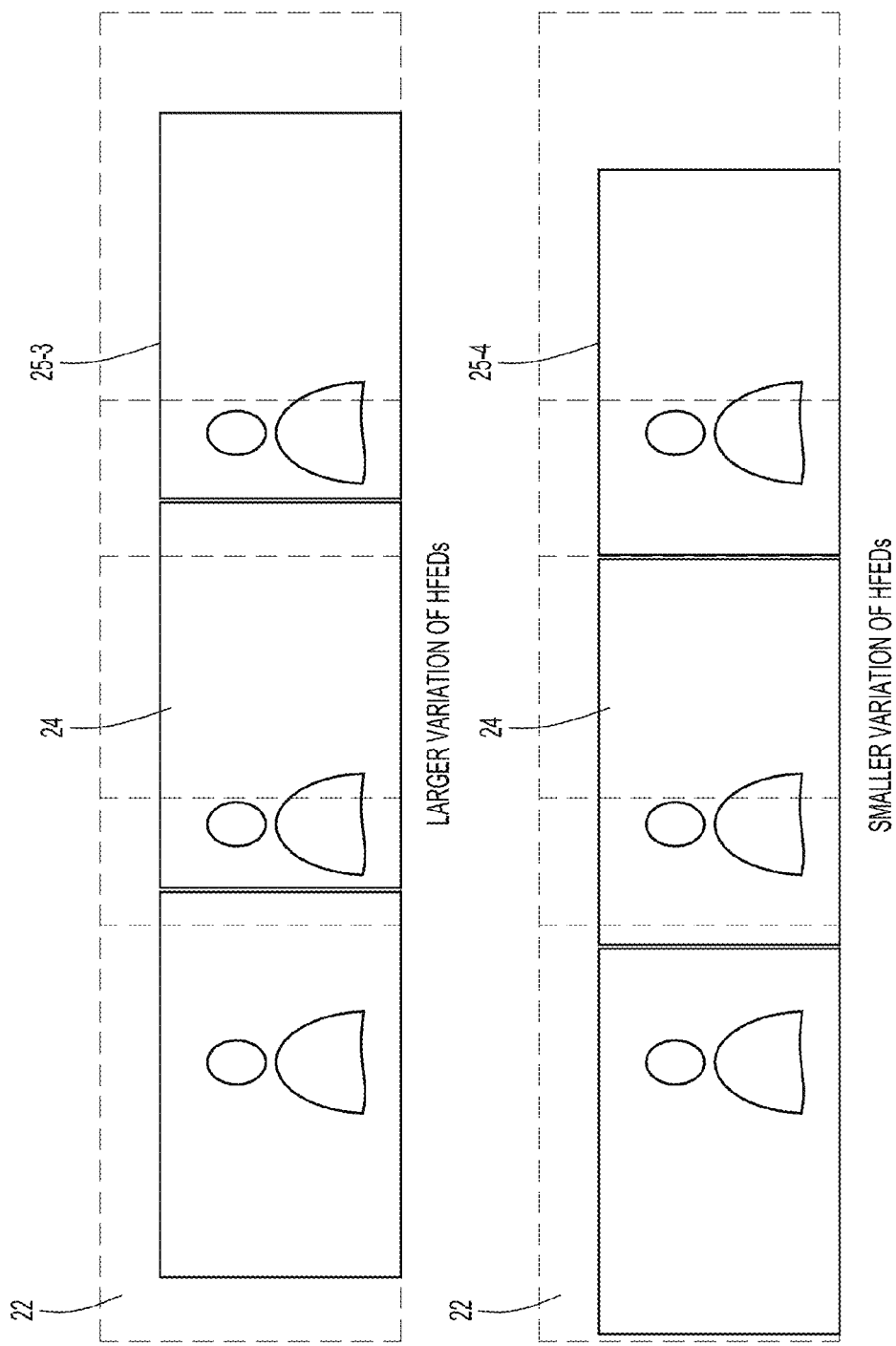

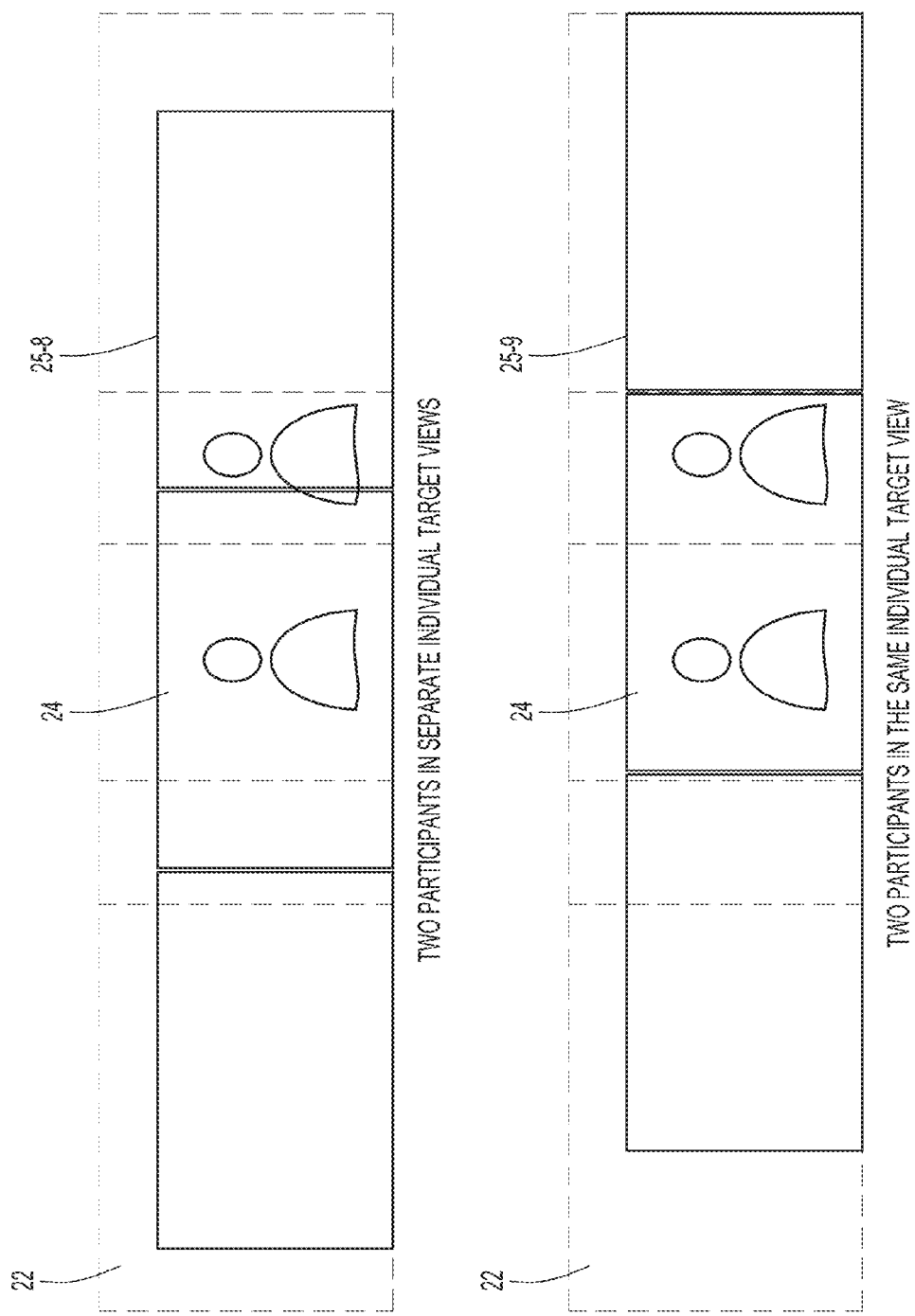

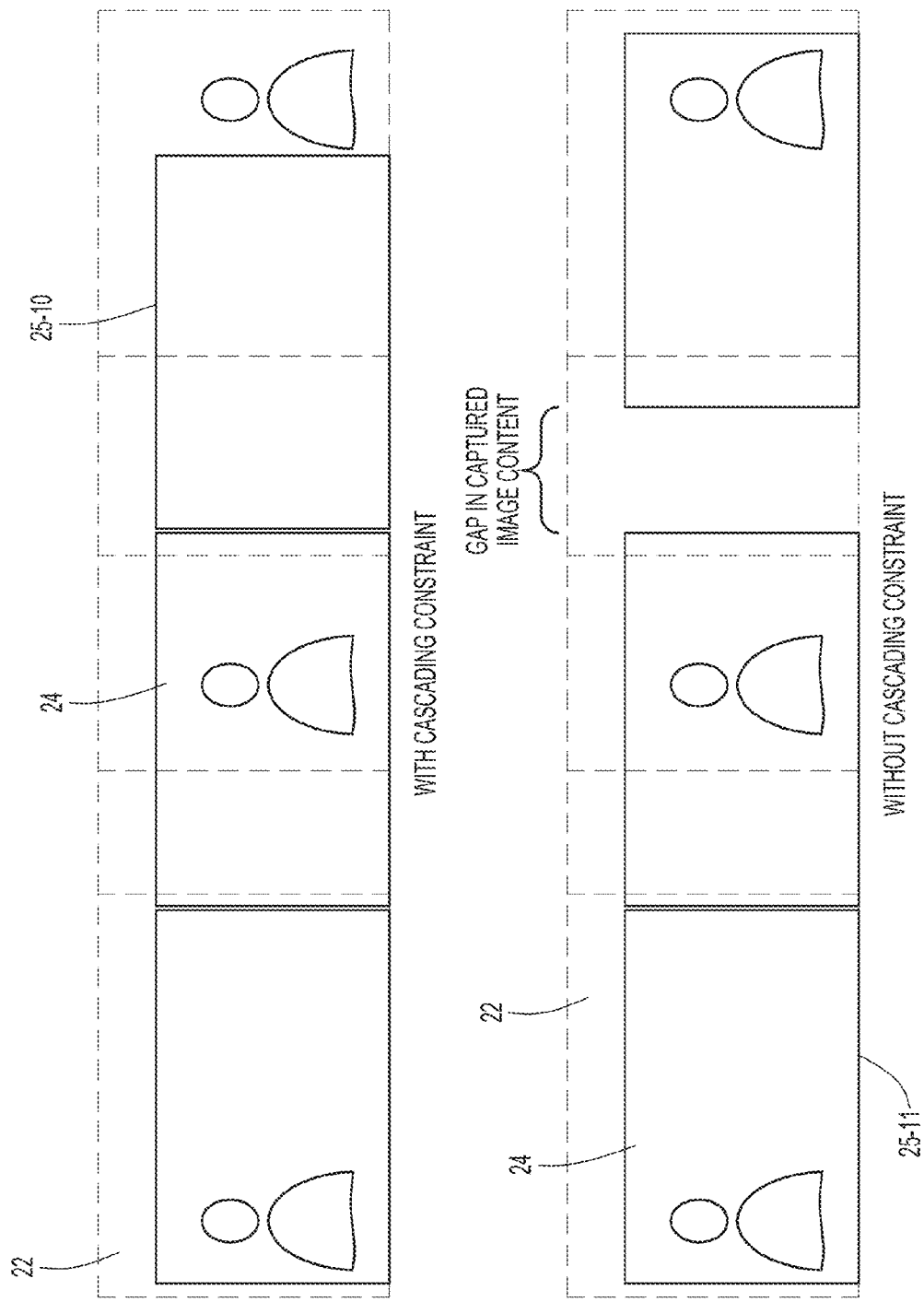

UTILIZING A SMART CAMERA SYSTEM FOR IMMERSIVE TELEPRESENCE

CROSS REFERENCE TO RELATED APPLICATION

This application is a continuation of U.S. application Ser. No. 13/793,524, filed Mar. 11, 2013, pending, the entirety of which is incorporated herein by reference.

TECHNICAL FIELD

The present disclosure relates to capturing video images of people and surroundings in a meeting room utilizing a plurality of cameras in an immersive telepresence environment.

BACKGROUND

Immersive Telepresence (ITP) systems (e.g., CTS 3000 and TX 9000 commercially available from Cisco Systems, Inc.) typically use a cluster of high-resolution (HD) cameras with fixed fields of view (FOVs) to capture multiple seating segments in a room (see FIG. 1A). The camera FOVs are combined or cascaded such that when images are displayed on screens of a remote ITP system, they appear as if taken from a single camera with an ultra-wide FOV. There is typically no overlap of FOVs between adjacent cameras capturing images.

Despite the simplicity of providing cameras with non-overlapping FOVs in ITP environments, this limits the seating arrangement in an ITP room, since a person seated across two FOVs from two cameras will appear partially in two images (and an incomplete image or a slightly distorted image of the person may appear in the cascaded view displayed, e.g., by a remote system). In order to prevent the occurrence of such a scenario, typical ITP rooms use purposely built tables with physical constraints, referred to as "knee lockers", to limit the seating arrangement around tables within the ITP room (so as to prevent any person from being located between the adjacent FOVs of two cameras).

BRIEF DESCRIPTION OF THE DRAWINGS

FIGS. 5A, 5B, 5C, 5D and 5E are example embodiments depicting target views within overlapping camera views in which various adjustments to the target views can be implemented according to smart camera metric (SCM) criteria and utilizing techniques as described herein.

FIG. 6 is an example embodiment depicting target views within overlapping camera views in which adjustments can be made to target views by relaxing a cascading constraint for the target views in accordance with techniques as described herein.

DESCRIPTION OF EXAMPLE EMBODIMENTS

Overview

Figure 1:
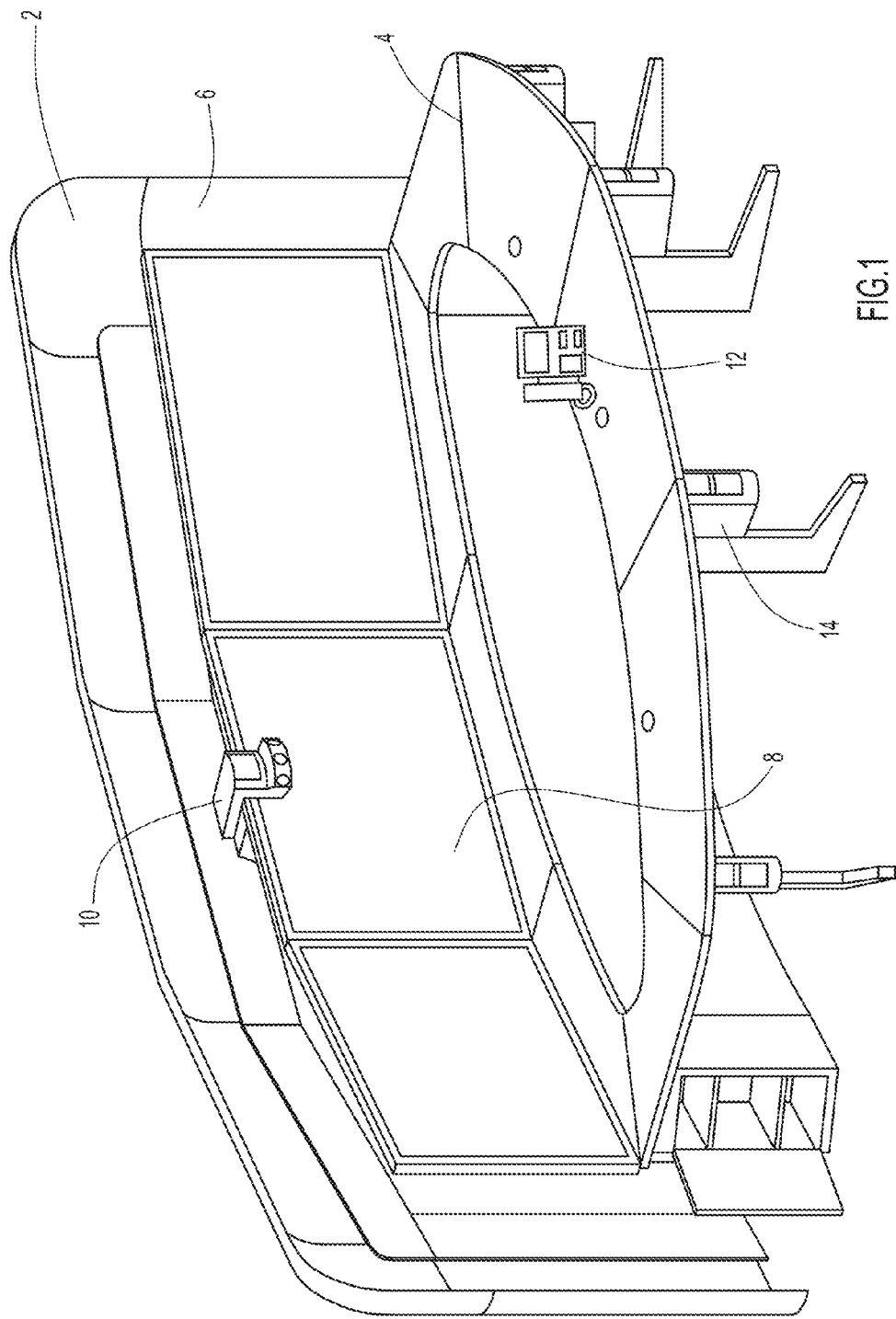
FIG. 1 is a view in perspective of an example embodiment of an Immersive Telepresence (ITP) room that can be utilized with systems and techniques as described herein.

Presented herein are techniques for receiving at a computing device video content comprising a first number of camera views provided by a plurality of video cameras that are aligned to capture images of participants within a defined space, where each camera view is at a first resolution and the video cameras are aligned such that a field of view (FOV) for each camera overlaps a portion of the FOV of at least one other adjacent camera. The computing device detects positions of participants depicted within the video content, where at least a portion at least one participant is captured by overlapping FOVs of two adjacent camera views, and a target view is generated by the computing device from the first number of camera views. The target view has a second resolution that is lower than the first resolution and also includes a view of the at least one participant captured within the overlapping FOVs of two adjacent camera views. The target view is further displayed at a display device.

Example Embodiments

In accordance with systems and techniques described herein, a "smart" camera apparatus or system is provided for an immersive Telepresence (ITP) room to capture images from multiple cameras within a defined space such as an ITP room and combine the images in a unique and efficient manner for display as a wide view to endpoints within an ITP meeting.

The cameras can capture life-size views for meeting participants within an ITP room at various positions along a table or at other areas within the ITP room. A "life-size" view, as described herein, refers to a display of one or more participants, furniture or other features within an ITP room that are proportioned within the video displays to be substantially the same dimension(s) or similar to the same dimension(s) as the actual participants, furniture, etc. within the ITP room. A plurality of ultra-high definition (UHD) video cameras is provided in a group or cluster, where the video cameras are positioned in a suitable alignment to have overlapping FOVs between adjacent cameras. One or more software programs can be provided for modifying the desired FOVs utilizing electronic pan-tilt-zoom (EPTZ) features, in which the images captured by the FOVs are digitally modified or transformed to focus on one or more regions of interest (ROIs) within the FOVs. For example, an electronic pan, tilt or zoom function can be applied to an image to focus on a particular ROI within the image (e.g., placing the ROI in the center of the EPTZ modified FOV, magnifying the ROI, etc.). Utilizing EPTZ techniques facilitate the generation of ROIs within the captured video images that appear as though the cluster of UHD video cameras are providing cascaded FOVs.

Providing UHD video cameras that are arranged such that FOVs of adjacent cameras overlap, a meeting participant seated at any location along a table or located at any position within the ITP room that is covered by one or more FOVs will be fully captured. Ultra-high definition (e.g., 4000×2000 pixels) cameras further provide oversampled pixels that can be utilized in combination with a EPTZ process to produce a full high definition (HD) output at a lower resolution (e.g., 1920×1080 pixels) for each camera with the same or higher image quality than a standard HD camera typically in use. The partially overlapping UHD cameras form a virtual cluster of HD video cameras which, instead of providing a combined FOV that is fixed with respect to a table or some other object within an ITP room, have a combined FOV that can be changed using EPTZ as needed (e.g., when seating arrangements are changed around a main table of the ITP room).

In accordance with techniques described herein, operation of the UHD cameras with overlapping FOVs is controlled utilizing one or more suitable algorithms that, given a particular location of identified human participants to be captured for a meeting session (e.g., based upon the particular seating of participants within the ITP room), a proper target view is determined such that cascaded HD images can be generated to properly frame each identified participant in one of the cascaded HD images and further provide an appropriate sizing (e.g., as close to life-size as possible) based upon the number of participants and distance between participants to be captured within the target view.

Example embodiments of a camera system or apparatus the yields a "smart camera" to capture desired views associated with ITP meetings in accordance with techniques described herein is described with reference to the figures. Referring to FIG. 1, an ITP room 2 is depicted in which a table 4 is provided having a suitable dimension and shape (e.g., semicircular) to facilitate seating of any suitable number of participants around the table 4. A back wall 6 is provided and includes a plurality of video displays 8 (e.g., LCD displays) for displaying video and/or other types of content (e.g., video images of participants at other meeting endpoint locations, content associated with a meeting, etc.). A plurality of UHD video cameras 10 are mounted at a suitable location and supported, e.g., by the back wall 6. The UHD cameras 10 are positioned to capture video images of the ITP room, including participants seated at different locations along the table 4. The ITP room 2 can include electronic devices, including one or more phones (e.g., phone 12 as shown in FIG. 1), computing devices and/or any other suitable electronic devices to facilitate communications and exchange of content associated with an ITP meeting. In addition, other components, such as lighting equipment (e.g., mounted along the back wall 6), microphones, speakers, etc. can also be provided at any one or more suitable locations within the ITP room 2 to provide adequate lighting, adequately capture speaking participants within the ITP room 2, and also provide adequate sound from content provided to the ITP room 2 during a meeting from other meeting endpoints (e.g., audio content generated by speaking participants at other meeting endpoints). To achieve an immersive experience, audio capturing and rendering are dependent upon activating microphones and speakers in suitable proximity to speaking participants, and the ITP system is configured to perform such activation automatically or facilitate manual activation of the microphones and speakers within the ITP room 2 during a meeting.

Knee locker structures 14 are also depicted in FIG. 1 as being connected to supporting structure for the table 4, where the knee locker structures 14 are positioned at locations to prevent extended movement of one or more seated participants with respect to the table 4. The knee locker structures 14 are shown in FIG. 1 to provide an example depiction of how typical ITP rooms are designed with such structures 14 to prevent movement of participants seated at specific locations along the meeting table (e.g., to ensure participants are captured within FOVs of the cameras in typical ITP meeting rooms). However, it is noted that such knee locker structures 14 are not required for the ITP systems and techniques described herein.

Figure 2A:
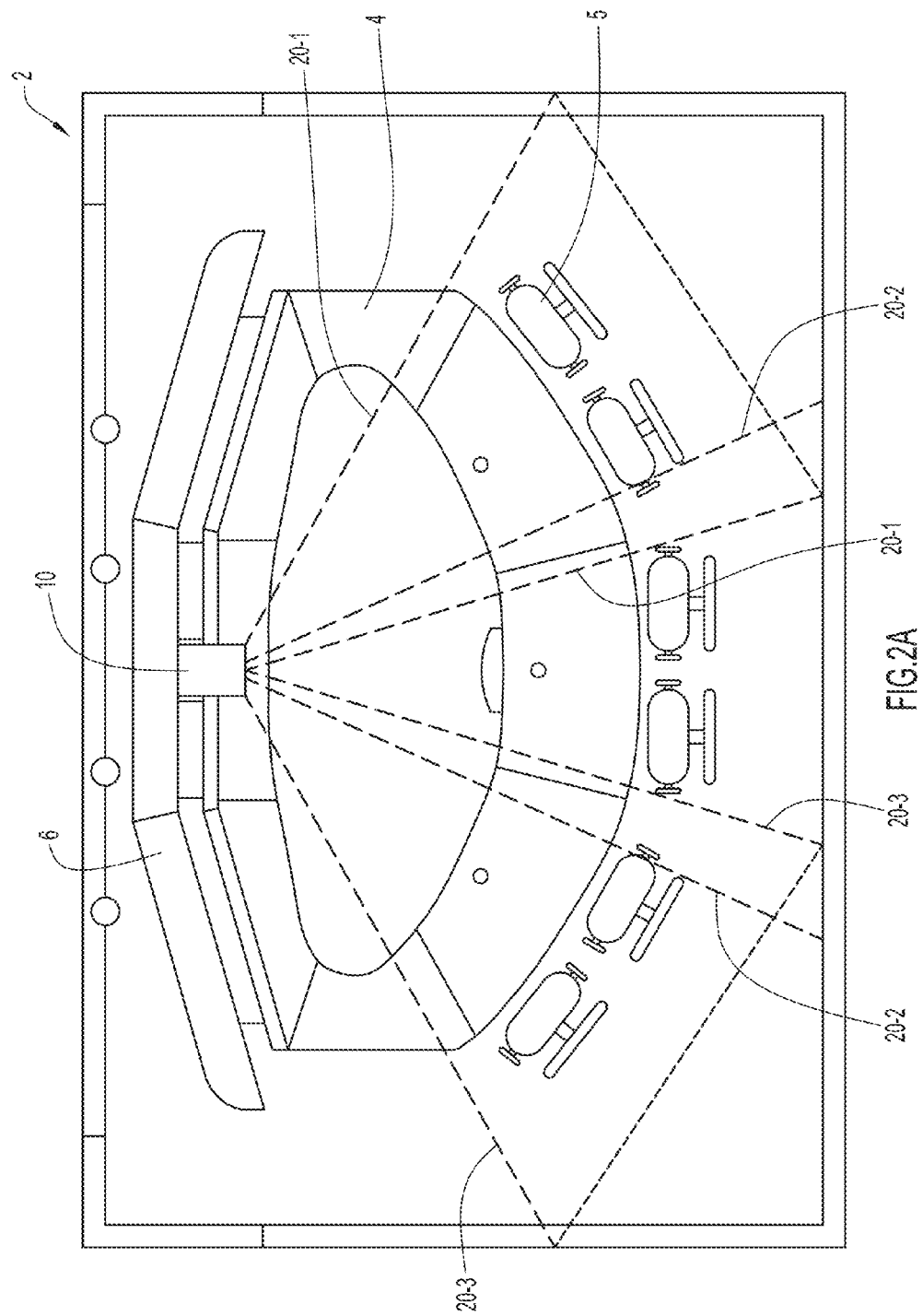
FIG. 2A is a top view in plan of the ITP room of FIG. 1 and showing overlapping field of views (FOVs) associated with the UHD cameras provided in the ITP room.

Referring to FIG. 2A, a view in plan within the ITP room 2 is depicted that includes an arrangement or cluster 10 of UHD video cameras which facilitate operation of an ITP system in accordance with techniques described herein. The table 4 includes chairs 5 arranged around the table to facilitate seating of multiple participants to be captured in video images by the UHD video cameras. Knee locker structures 14, as depicted in FIG. 1, are not necessary when utilizing the systems and techniques described herein and thus are not depicted in FIG. 2A. The dashed lines 20-1, 20-2, and 20-3 represent the boundary lines for the field of view (FOV) for each UHD camera 10 in the cluster. In particular, the cluster 10 includes three UHD video cameras, where the FOVs of adjacent UHD video cameras overlap, as evident by the overlap between FOV lines 20-1 and 20-2 and the overlap between FOV lines 20-2 and 20-3. It is further noted that the ITP rooms can be configured such that the number of video displays (e.g., video displays 8 as shown in FIG. 1) correspond with the number of video cameras in the cluster 10 (e.g., three video displays 8 to depict views provided by three video cameras associated, e.g., with an ITP room of another meeting endpoint).

Figure 2B:
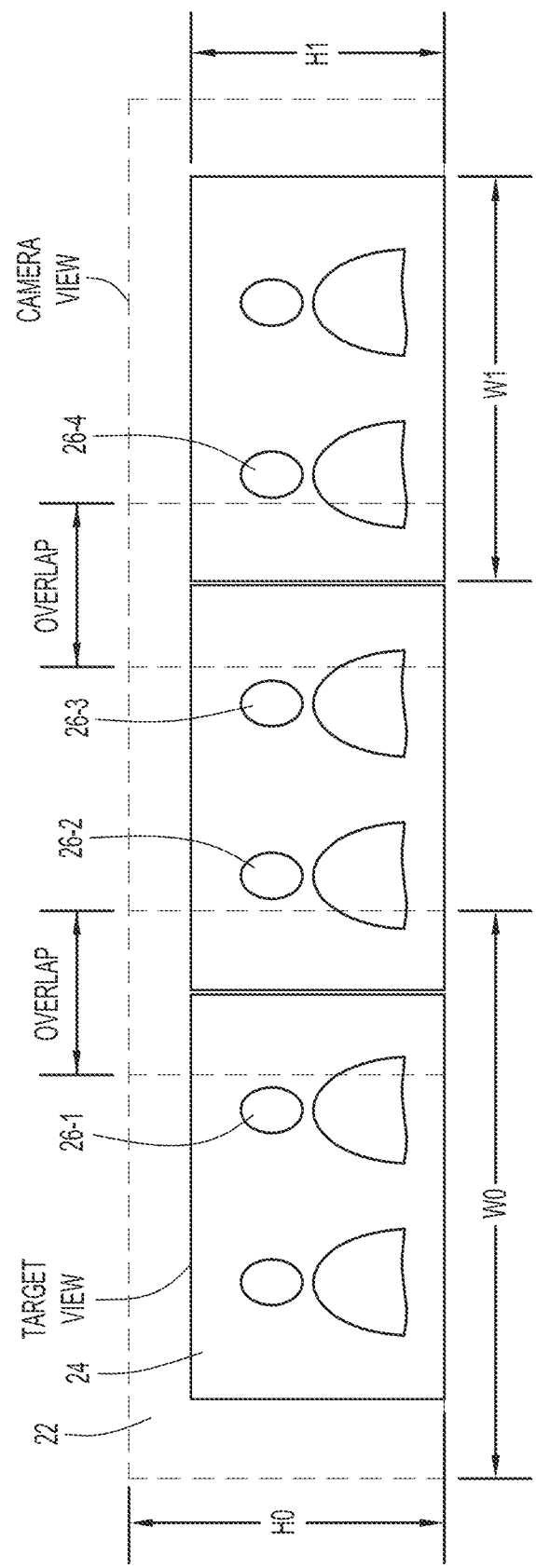
FIG. 2B is an example representation of the overlapping camera views and target views to be displayed associated with the camera arrangement depicted in the example embodiment of FIG. 2A.

A representation of the camera views and target views to be presented on video displays of other ITP rooms is depicted in FIG. 2B. The camera views 22 captured by the UHD video cameras of the cluster 10 are depicted in the dashed lines, including overlapping areas of adjacent FOV lines (i.e., FOV lines 20-1, 20-2 and 20-3 as shown in FIG. 2A). Target views 24 to be displayed by the video displays (e.g., video displays for an ITP room having a similar arrangement as the video displays 8 shown in FIG. 1) are depicted in the solid lines. It is noted that the target views 24 (solid lines) and camera views 22 (dashed lines) are also depicted in this manner in FIGS. 4-7. The target views are determined based upon the techniques described herein. The resolution or pixel dimensions of the UHD camera views 22, shown in FIG. 2B as W0×H0 (e.g., 4096×2160 pixels), are greater than the resolution or pixel dimensions of the target views for the video displays, shown in FIG. 2B as W1×H1 (e.g., 1920<W1<W0 pixels, and 1080<H1<H2 pixels). The individual target views 24 are cascaded to form a combined target view on the three display panels (i.e., each individual target view 24 is displayed by a corresponding display, such that the cascaded displays represent a combined target view). In particular, the overlap of captured video content by the camera views 22 is eliminated when the individual target views 24 are generated, such that an overall or combined target view appears as a single, continuous view of video content extending across one or more displays within an ITP room or other meeting endpoint. An EPTZ process combined with the techniques described herein capture camera images to form a suitable target image. Portions of certain participants, such as participants 26-1, 26-2, 26-3 and 26-4, fall within the overlapping areas between adjacent FOVs of the UHD video cameras. The target image is processed so as to present target views that entirely capture each identified participant of interest within a single target view 24.

Due to the target views 24 having smaller dimensions than the camera views 22, the target views 24 can be generated at any locations along the video content defined by the camera views 22. In particular, a single or individual target view 24 can be defined entirely within one camera view 22, or an individual target view 24 can be defined as extending between two overlapping camera views 22. The overlapping portions of the FOVs for camera views 22 are processed in any conventional or other suitable manner to eliminate overlapped content such that the overlapping areas are redefined as continuous video content extending between the adjacent camera views 22 (thus allowing a generated target view 24 to be located at any position within two or more camera views while representing continuous and non-overlapping video content).

Electronic pan-tilt-zoom (EPTZ) processes can be utilized to generate a target image by cropping and/or scaling a region of interest (ROI) from an original image that has a higher resolution and/or a larger FOV, such as in the embodiment depicted in FIG. 2B. The ROI, which represents a target view, can be pre-defined, e.g., as a life-size and near frontal-facing view of one or two meeting participants within a single camera view. However, this is an ideal scenario. In practice, however, there may be no frontal-facing views available, or there may be more than one frontal-facing view available for selection, or a life-size view may not always be preferred (since, e.g., this may limit the number of participants that can be displayed in the combined target view). For example, in a scenario in which it is desired to capture four meeting participants, it may not be possible to capture all four meeting participants at life size, since to do so would result in at least one or more participants not being entirely captured within the combined target view. The techniques described herein are utilized to determine the best way to obtain a combined target view (e.g., by reducing size of the participants or any other suitable techniques) that results in some or all four meeting participants being captured within the combined target view. In accordance with techniques described herein, the system utilizes smart camera metrics to automatically determine whether a combined target view will include, e.g., (a) two of the four participants at life-size dimensions, (b) all four participants with smaller than life-size dimensions, (c) three of the four participants with smaller but close to life-size dimensions (while the fourth participant may be at life-size dimensions), etc.

A further issue associated with generating individual target views from a cluster of UHD video cameras so as to form an overall target view comprising the cascaded individual target views that is non-overlapping and depicts a combined view of the ITP room is what to do with participants that are captured by two camera views (i.e., when at least some portion of a participant falls within the overlapping FOVs of adjacent cameras, such as participants 26-1, 26-2, 26-3 and 26-4 of FIG. 2B). The techniques described herein address these various issues so as to provide an overall target view comprising the individual target views that provides a continuous, non-overlapping view of the ITP room while also capturing participants of interest that are proportionally sized about the same (e.g., life-sized or any suitable size that is the same or similar for all displayed participants). Further, participants that fall within overlapping camera views are only shown in a single individual target view (i.e., the overlapping camera views are processed such that no two individual target views contain the same content from an overlapping portion of two camera FOVs).

Figure 3:
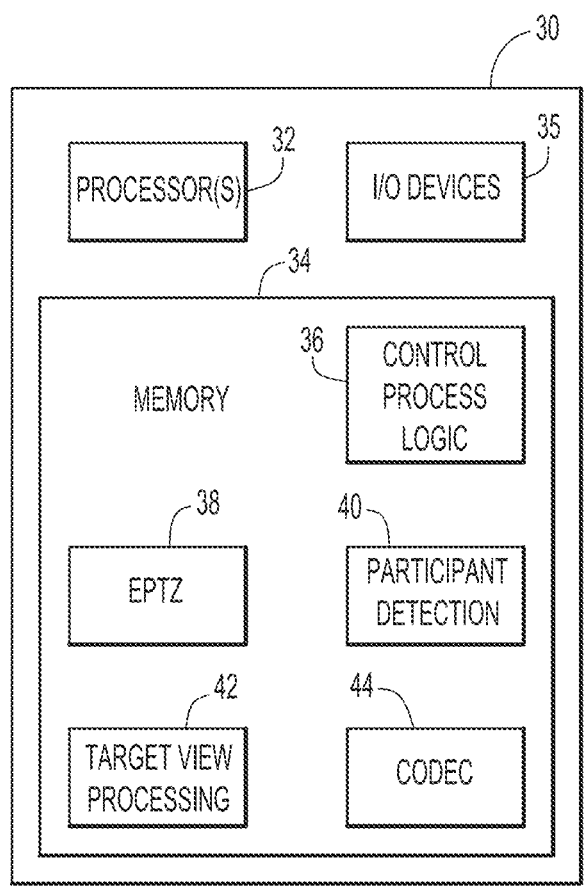
FIG. 3 is a schematic block diagram of an example embodiment of an ITP server device for use with the ITP room depicted in FIGS. 2A and 2B.

An example embodiment of a control server that automatically controls the "smart camera" system utilizing the techniques described herein is schematically depicted in FIG. 3. The server 30 includes at least one processor 32, a memory 34, and optionally various types of input/output (I/O) devices 35 (e.g., any one or more of a keyboard, a mousepad, a touch screen, a display, etc.) to facilitate input and output of data in relation to the server 30 (e.g., to facilitate user control of the server). The server 30 can further include any suitable network device (e.g., one or more of an Ethernet interface card or switch, a modem, a router or any other suitable hardware device) that facilitates a wireless and/or hardwire connection with a network (e.g., local or wide area networks, Internet Protocol (IP) networks such as intranet or internet networks, telephone networks such as public switched telephone networks, wireless or mobile phone or cellular networks, etc.) so as to connect in any suitable manner with other meeting endpoints (e.g., other, remote ITP rooms) via the network for exchange of video content as well as any other types of content associated with meetings.

The processor(s) 32 can comprise at least one microprocessor that executes control process logic instructions 36 stored within memory 34, including operational instructions and software applications stored within such memory that perform operations in relation to control of the UHD cameras of the ITP room as well as processing video images captured by the cameras to provide an overall (combined) target view for display (e.g., at other ITP rooms) within a meeting utilizing the techniques as described herein.

For example, the memory 34 includes one or more EPTZ applications 38 that electronically modify FOV images captured by the UHD cameras within the cluster 10 of an ITP room 2 based upon a desired target view within the captured images. The memory 34 also includes one or more participant detection applications 40 (e.g., body detection software application(s) and/or face detection software application(s)) to locate and identify participants within the ITP room 2 seated or positioned around table 4. For example, the applications 40 can include body detection software that identifies outlines of participants and determines whether any portion of a participant is missing from a target view. The applications 40 can also include face detection software that identifies any human face within an image (based any suitable conventional or other known algorithms). The applications 40 can further include face recognition software that, in addition to identifying human faces within an image, also provides an identification of one or more specific persons associated with the identified face image (e.g., by comparison of features of an identified face with a storage library of known faces to find a match that identifies a specific person for the identified face). In addition, the memory 34 includes one or more target view processing application(s) 42 including algorithms or smart camera metrics (SCM) to determine a proper (combined) target view to be generated based upon positions of identified participants of interest. The memory 34 further includes one or more encoding/decoding (codec) applications 44 to facilitate encoding of video images and/or other types of content associated with a meeting for sending to other meeting endpoints via the network as well as decoding of video images and/or other types of content received for display at the ITP room 2 in associated with a meeting.

Figure 8:
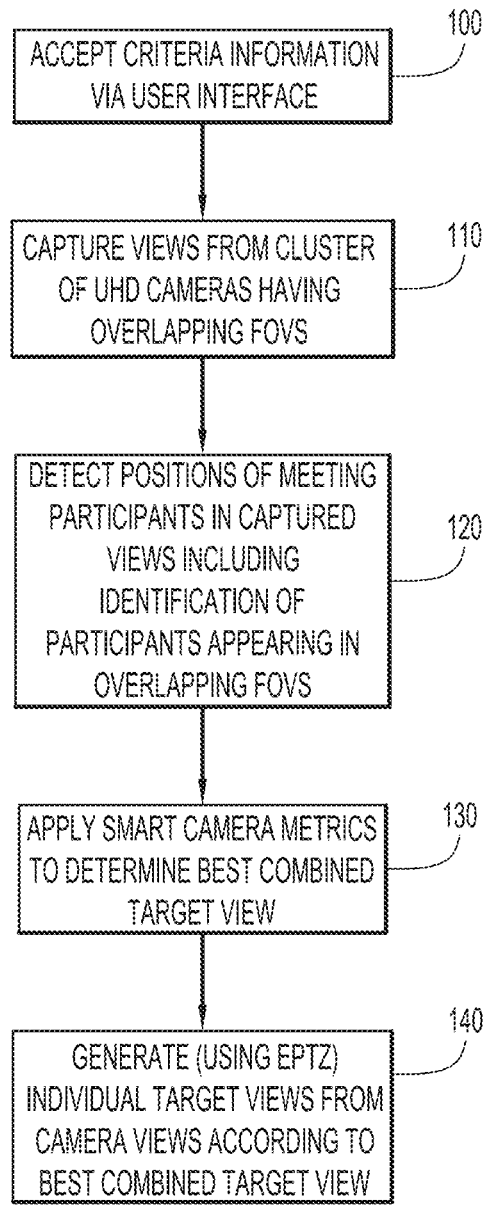
FIG. 8 is a flow chart generally illustrating an example method for automatically generating a combined target view comprising individual target views utilizing the systems and techniques described herein.

The processor(s) 32 of the server 30 perform operations in accordance with the steps set forth in the flow chart of FIG. 8 utilizing the control process logic 36 and applications 38-44.

The memory 34 may comprise read only memory (ROM), random access memory (RAM), magnetic disk storage media devices, optical storage media devices, flash memory devices, electrical, optical, or other physical/tangible memory storage devices, and any combinations thereof. The server 30 can comprise any one or more suitable computing devices including (e.g., stationary (e.g., desktop) computers and/or laptops, etc.), where the computing device(s) can utilize any suitable operating systems (e.g., Android, Windows, Mac OS, Symbian OS, RIM Blackberry OS, Linux, etc.) to facilitate performing operations within the ITP room 2 (including processing of video images captured by the UHD cameras and exchange of content via the network with other meeting endpoints in a meeting).

The target view processing application(s) 42 include smart camera metric (SCM) algorithms to determine a proper (combined) target view given identified positions of all meeting participants. In particular, video images received from the UHD cameras of the cluster 10 are analyzed by the participant detection application(s) 40, utilizing face detection and/or face recognition software. Based upon identified locations of participants within the images, the target view processing application(s) 42 utilize EPTZ features via the application(s) 38 to electronically pan, tilt and/or zoom within the captured images based upon a region of interest (ROI) to be represented within the overall target view to be generated. In the examples provided herein showing the use of EPTZ features to generate a desired overall target view, the SCM algorithms utilize electronic pan and zoom within images. This is because participants are presented as seated within the images (i.e., the heads/faces of participants are generally aligned at the same plane of elevation or within a small deviation from such plane of elevation in the captured images by the UHD cameras). However, it is noted that electronic tilt can also be utilized by the SCM algorithms, depending upon a particular scenario (e.g., one or more participants may be standing, while some are sitting) to generate the determined target view to be generated for display at displays within ITP rooms associated with a meeting.

The SCM algorithms utilized by the target view processing application(s) 42 determine target views to be generated from the camera views captured by the UHD cameras (e.g., as depicted in FIG. 2B) which are used to provide a combined, cascaded target view on the displays of an ITP room (e.g., the three displays 8 in ITP room 2), where the combined target view is continuous with no overlap in target view content. In other words, the combined target view is the combination of target views for display at the displays within the ITP room that results from a processing of the overlapping FOVs of the camera views to result in a continuous view depicted across the displays within the ITP room. The SCM algorithms further account for the proportions of participants within the video images captured by the UHD cameras and process the images, using the EPTZ features provided by the application(s) 38, such that the participants are depicted within the overall target view as close to life-size in appearance as is possible while still capturing all identified participants within the combined target view. In the example embodiments depicted herein, the combined target view is represented at three displays associated with an ITP room, where each of the three displays provides a target view including content generated from one or more captured camera views of UHD video cameras from the cluster provided within an ITP room (i.e., three displays correspond with three UHD video cameras with overlapping FOVs for adjacent cameras). However, it is noted that the techniques described herein can be implemented utilizing any selected number of UHD video cameras that capture video images within an ITP room (e.g., three video cameras, four video cameras, etc.).

The target view processing application(s) 42 can be provided with any suitable criteria information that is utilized in the SCM algorithms to select a defined region of interest (ROI) that must be present within the target views obtained from captured camera views for generating an overall or combined target view. For example, criteria information may require that any participant that is a current speaker within the ITP room appear in the combined target view (the location of the current speaker can be identified based upon identification of a microphone within the ITP room that is currently being used by the current speaker, where the microphone has a defined location within the ITP room), with the further requirement that as many other participants as possible are also captured in closest proximity to the current speaker.

Another example of criteria information is that certain identified participants within an ITP room must be captured within the combined target view at all times during meeting. Other criteria may require that target views associated with the captured camera views need to be adjusted in response to movements of participants within the ITP room. For example, if a combined target view is generated and displayed, and one or more participants then decide to move such that some portion of each moving participant is no longer within but is slightly outside of the combined target view, this is detected by applications 40 and the SCM algorithms of application(s) 42 can account for this by electronically shifting or panning the combined target view in a direction (using EPTZ application(s) 38) and/or electronically zooming in or out (using EPTZ application(s) 38, where the electronic zooming will change the proportions of the displayed participants) to ensure the moving participants are completely captured by the combined target view.

Figure 4:
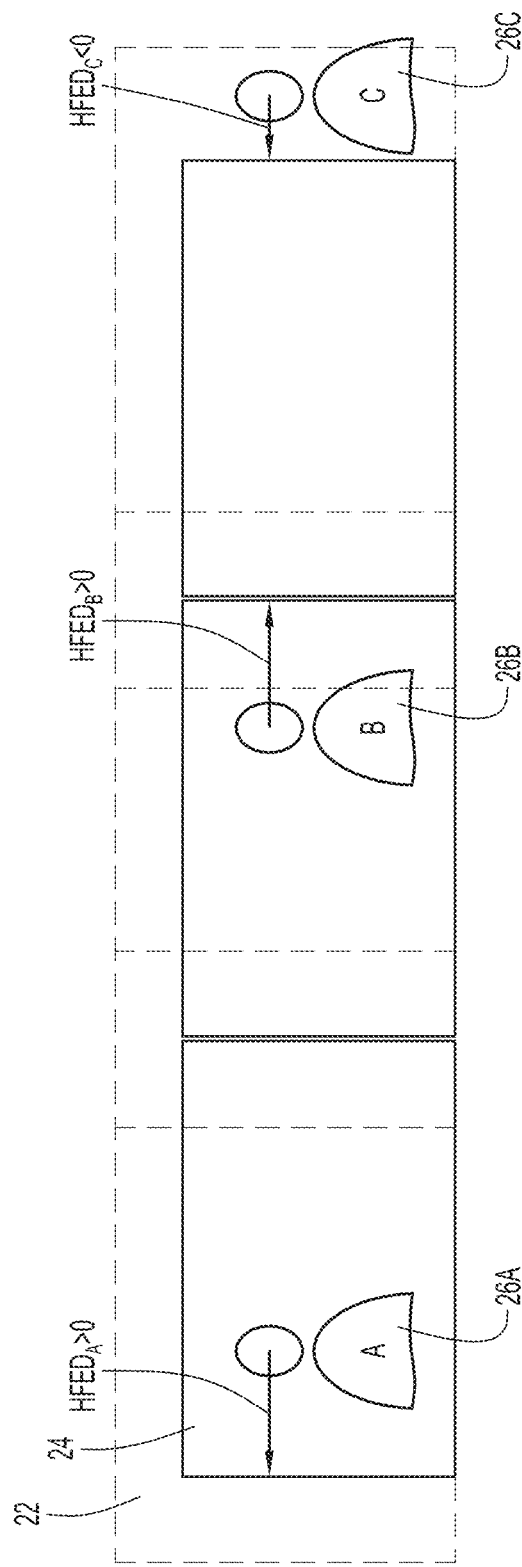
FIG. 4 is an example embodiment depicting target views within overlapping camera views in which locations of participants within the target views are defined in accordance with techniques described herein.

Thus, in a combined target view, a meeting participant may be contained by one of the individual target views obtained from the captured camera views, or partially or completely fall out of the target views. In order to define a location of meeting participants with respect to the individual target views, initial target views can be defined by the SCM algorithms from the captured camera views. The SCM algorithms can quantify a position of a meeting participant in relation to an initially defined target view by measuring a distance from identified center coordinates of the detected face of a participant within an individual target view to the closer edge of the individual target view that contains the face or is closest to the face if the face is not in the target view. The distance measure is referred to as Horizontal Face-to-Edge-Distance (HFED). An example embodiment of measuring HFED values for participants within initially defined target views is depicted in FIG. 4. HFED values are defined such that an HFED value for a participant is at a maximum value when the identified face of the participant (as determined utilizing applications 40) is at the center of an individual target view. The HFED value decreases as the face of the participant is shifted toward a border or edge of the individual target view. In addition, an HFED value can have a negative value when a face falls outside of the individual target view. For the individual target views 24 obtained from the captured camera views 22 depicted in FIG. 4, participants 26A and 26B have $HFED_A$ and $HFED_B$ values greater than zero, whereas participant 26C (which is outside of the individual target view 24) has an $HFED_C$ value that is less than zero. The $HFED_A$ value may be slightly larger than $HFED_B$ value, since participant 26A is positioned slightly closer to the center of its individual target view 24 in relation to the location of participant 26B within its individual target view 24 (i.e., the distance from a center location of the face of participant 26A from an edge of its individual target view 24 is greater than a distance from a center location of the face of participant 26B from an edge of its individual target view 24, as shown by the lengths of the corresponding arrows in FIG. 4).

Figure 5A:
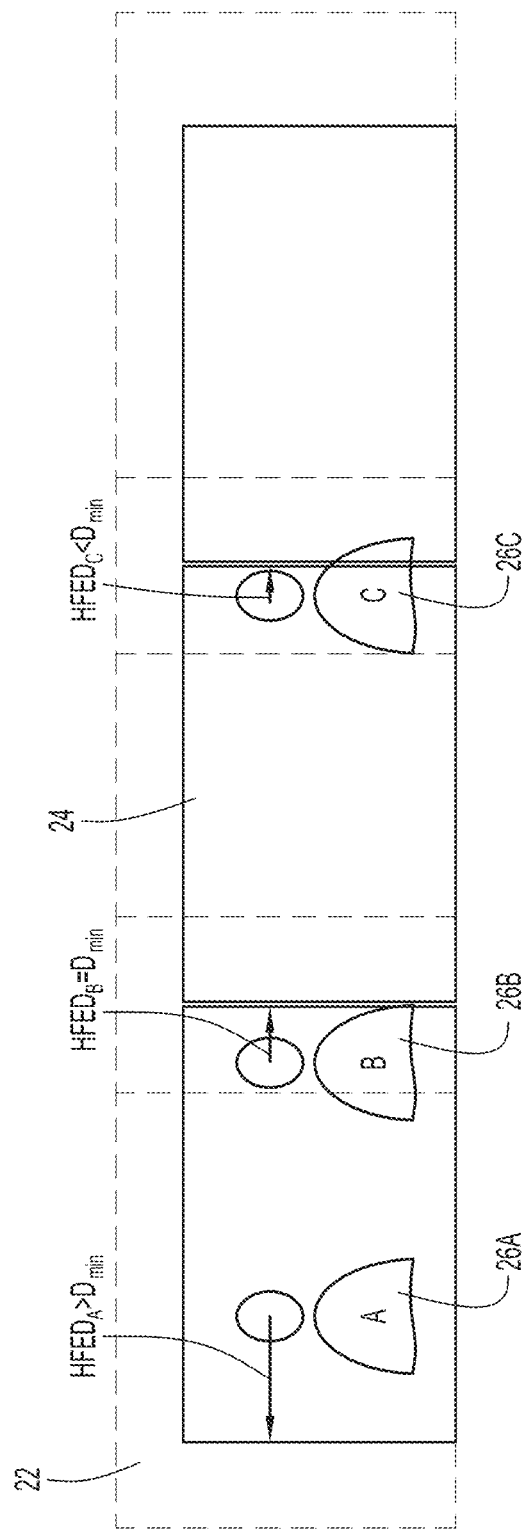
Figure 5B:
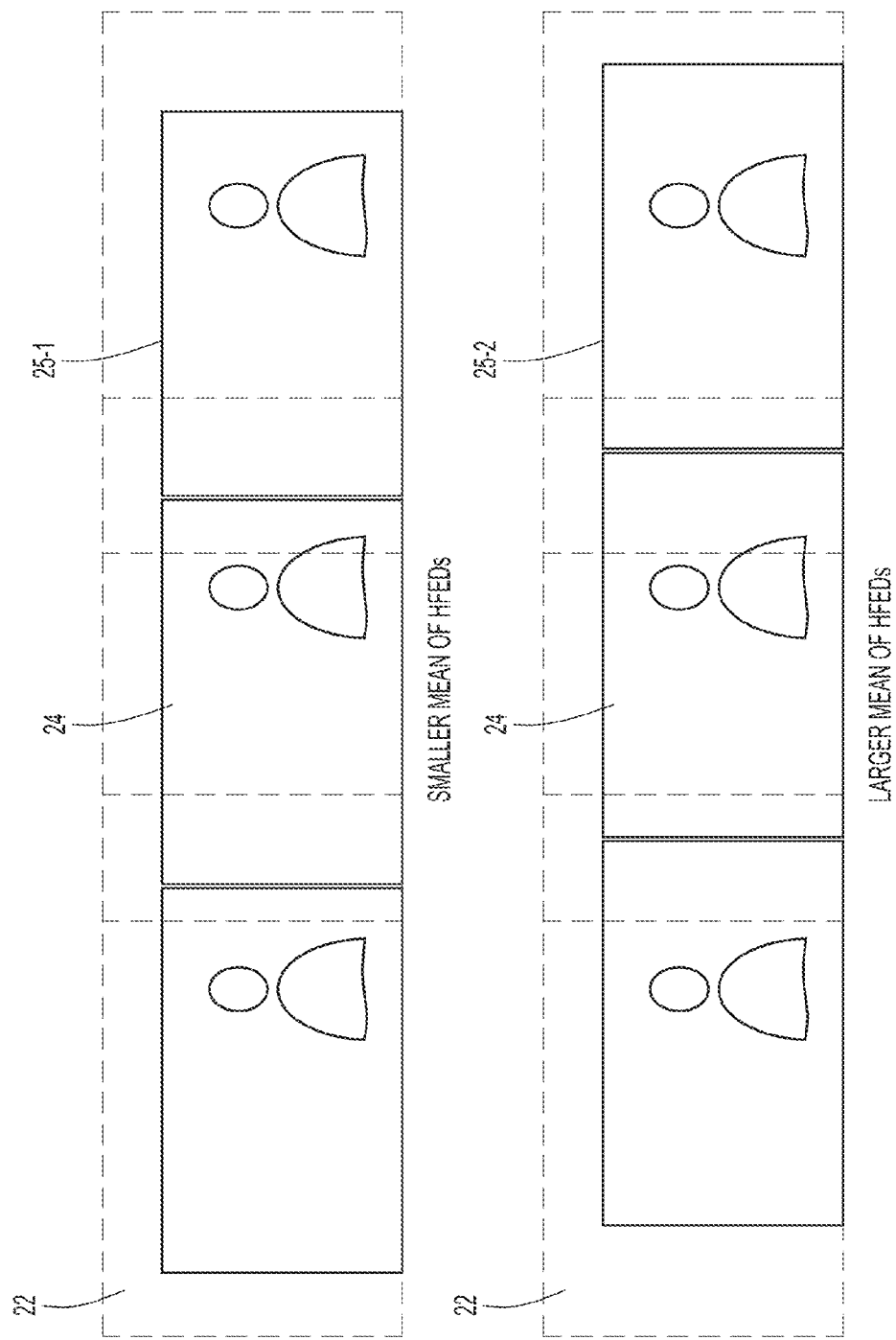

The target view processing application(s) 42 utilize the SCM algorithms to determine a best combined target view given known positions of all meeting participants in the individual target views, where the HFED values are used by the SMC algorithms to adjust individual target views in order to ensure a suitable combined target view that captured as many identified participants as possible at suitable proportions (e.g., life-size, if possible). Examples of certain factors or criteria taken into consideration by the SCM algorithms are provided below:

(a) The SCM algorithms consider the determined HFED of each face of a participant in each individual target view based upon a minimum threshold value. A minimum HFED distance, $D_{min}$, may be selected (e.g., this value may be a user input value or may be determined in any suitable manner by the SCM algorithms based upon a particular meeting scenario) and the SCM algorithms may require HFED to be greater than or equal to $D_{min}$ for all faces in the target view in order to avoid any meeting participant being depicted in the displays across individual target views. In the example embodiment depicted in FIG. 5A, HFED values are determined (based upon face detection software of applications 40 and utilizing the target view processing applications 42), where participant 26A has an $HFED_A > D_{min}$, participant 26B has an $HFED_B = D_{min}$, and participant 26C has an $HFED_C < D_{min}$. In this example embodiment, the combined target view would not be deemed acceptable by the SCM algorithms, since not every participant is adequately captured by one or more individual target views 24 (based upon the determination that at least one HFED value is less than $D_{min}$). In this scenario, the EPTZ application(s) 38 and target view processing application(s) 42 can be utilized to slightly shift the target views 24 (e.g., to the right as shown in FIG. 5A) and/or adjust the size (via electronic zoom in or zoom out features) in relation to the camera views 22 in order to ensure that all HFED values for participants 26A, 26B and 26C are greater than $D_{min}$.

(b) The SCM algorithms consider a mean of HFEDs for all faces (or faces of interest) of participants in a combined target view. A larger mean of HFED values indicates that better overall framing of the meeting participants has occurred within the combined target view. This is illustrated, e.g., in FIG. 5B in which two combined target views 25-1 and 25-2 are depicted (i.e., each combined target view 25-1, 25-2 comprises each of the individual target views 24). In particular, the average or mean of the HFED values for the three participants in the target view 25-1 is smaller in relation to the mean of the HFED values for the three participants in the target view 25-2 (since each HFED value is greater due to the face of each participant being located a further distance from an edge of each individual target view 24 in the combined target view 25-2 in comparison to the faces of participants in the individual target views 24 of the combined target view 25-1). Thus, in this embodiment, the SCM algorithms may determine that the combined target view 25-2 should be selected over the combined target view 25-1. A mean of HFED values for all faces of meeting participants that is greater than a predetermined mean threshold value can be used to provide an indication that the combined target view providing such mean represents a good framing of the participants within the combined target view.

(c) The SCM algorithms consider a variation from a predetermined or set value (e.g., a standard deviation from a mean or average) of HFEDs for all faces in a target view, where a smaller variation (e.g., a variation from the set value that is no greater than a variation threshold value) indicates more uniform positioning of all meeting participants in the target view. An example embodiment is depicted in FIG. 5C showing this feature. In particular, a standard deviation (SD) value of the HFED values for the participants in each of the combined target view 25-3 and the combined target view 25-4 can be determined by the SCM algorithms. The SD value for the participants in the combined target view 25-3 is greater than the SD value for the participants in the combined target view 25-4 (due to the participants in the combined target view 25-3 being at distances from the center of each individual target view 24 that vary to a greater degree in relation to the positioning of participants within the combined target view 25-4). In this example, the SCM algorithms may determine that the combined target view 25-4 should be selected over the combined target view 25-3.

Figure 5D:
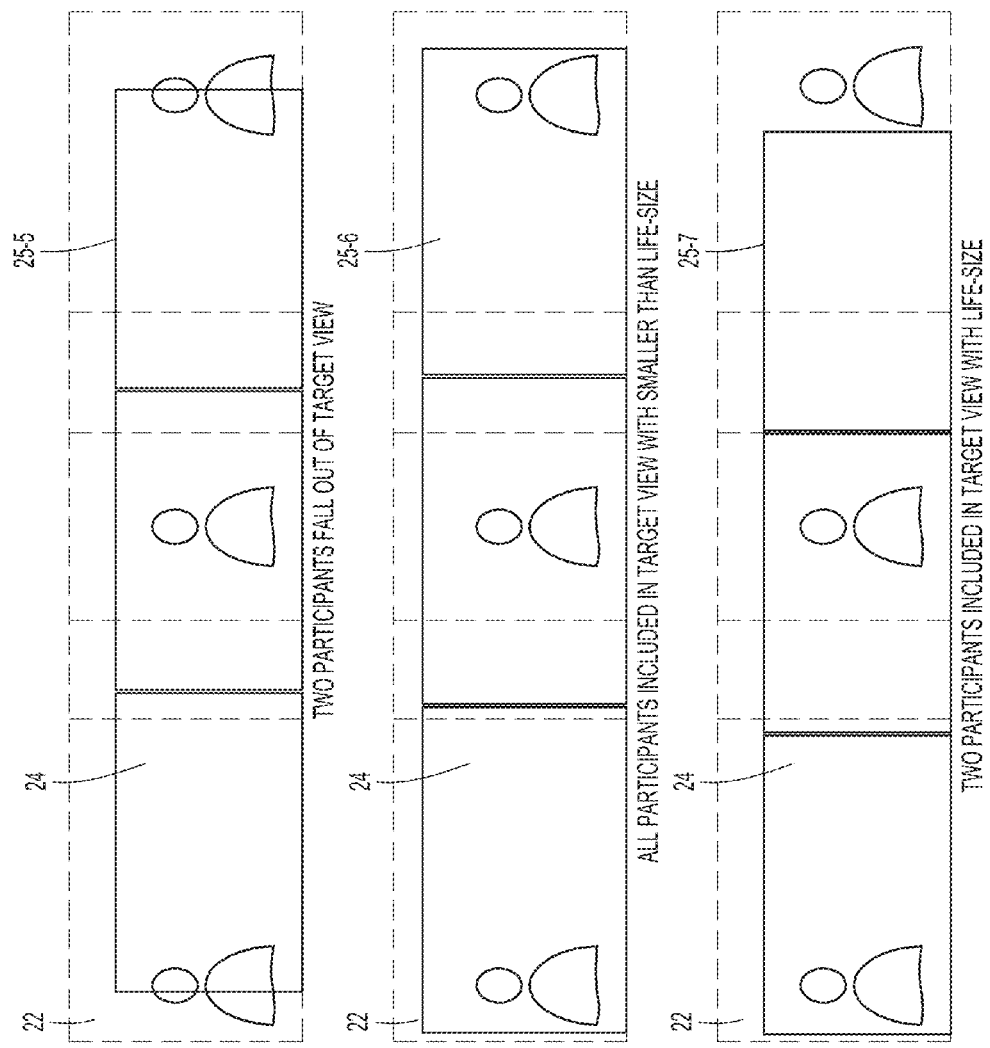

(d) The SCM algorithms make a determination of selecting a preference between a certain predefined proportion or dimension (e.g., a life-size dimension) for participants in the combined target view in relation to one or more alternative combined target views that may include as many participants as possible. In particular, in certain scenarios (e.g., based upon the locations and spacing between participants within an ITP room), in order to provide as many participants as possible within a combined target view the proportional sizing of the participants will need to be decreased (e.g., less than life-size). For some participants in an ITP meeting, there may be a stronger desire to see participants in the combined target view display at life-size (or as close to life-size as possible). The SCM algorithms may be provided with a user input variable, such as a "zoom-out" penalty factor, having a predetermined range (e.g., from 0 to 1) which defines a degree of user preference between proportional sizing of participants and number of participants to be displayed. The "zoom-out" penalty factor can be set, e.g., via user input in relation to any meeting, where a value of 0 indicates a user preference to see the most participants possible within the combined target view while a value of 1 indicates a user preference to see displayed participants as life-size or at some other predefined proportional dimensions even at the cost of losing a display of other participants within the combined target view (e.g., because not all participant seat positions can be accommodated utilizing the desired proportional view, such as a life-size view, of participants). An example embodiment is depicted in FIG. 5D with combined target views 25-5, 25-6 and 25-7. In this example embodiment, the three participants cannot all be displayed within a combined target view at life-size or some other desired proportional dimension (e.g., due to the participants being seated too far apart from each other at a table within an ITP room). The combined target view 25-5 depicts all participants displayed at life-size dimensions (based upon zooming into the captured camera views 22 using the EPTZ application(s) 38), where only a portion of two of the participants is displayed by two of the individual target views 24 (i.e., two of the participants fall out of the combined target view 25-2 due to the proportional sizing of the participants). Depending upon the "zoom-out" penalty factor, this may be deemed acceptable if the factor is a value of 1 or close to 1 (e.g., 0.9). Alternatively, if the "zoom-out" penalty factor is less than 0.5 or approaching 0 (e.g., 0.1 or 0.2), the proportional sizing of the participants may need to be adjusted to ensure that all participants (or as many as possible) are depicted within the combined target view. The combined target view 25-6 includes all participants that are smaller than life-size. Alternatively, the SCM algorithms can combine other criteria, such as any of the previously described criteria, to shift the combined target view so as to maintain life-size dimensions of participants while still including as many participants as possible within the combined target view, such as is depicted in the combined target view 25-7. This can be a result of the "zoom-out" penalty factor being assigned a value of, e.g., 0.5 or 0.6.

(e) The SCM algorithms can also be configured to generate individual target views that incorporate any selected number of and/or specific identified faces within a single individual target view. For example, in a meeting session that includes different types of meeting endpoints, such as one or more ITP rooms that include a plurality of displays and one or more meeting endpoints that include only a single display (e.g., a remote participant that may connect to the meeting via personal computer, laptop, tablet, etc.), the video content for participants in a room may need to be adjusted differently for meeting endpoints that include a different number of displays for displaying video and/or other meeting content. For the single display meeting endpoints, an individual target view may only be displayed. In this case, it may be desirable to provide as many participants, or at least participant faces, as possible within an individual target view, including at least the speaking participant at any given time (where the speaking participant can be identified as previously described herein). In an example embodiment depicted in FIG. 5E, a combined target view 25-8 may be shifted in relation to the combination of captured camera views 22 to a combined target view 25-9 for meeting endpoints having a single display (so as to include the two depicted participants within an individual target view 24 that is provided as video content to the meeting endpoints with a single display). The individual target view 24 can also be further shifted (e.g., utilizing electronic pan features of the EPTZ application(s) 38) to ensure that the participants are centered as close as possible within the individual target view 24 (e.g., based upon the determined HFED values for the participants).

Any one or more of the factors or criteria (a)-(e) as described herein, as well as any other suitable factors, e.g., the total number of participants included in the combined target view, the summation of HFED values (instead of mean) for the participants, etc., can be used alone or in any one or more combinations with each other by the SCM algorithms to determine a best combined target view for one or more meeting endpoints based upon criteria associated with the meeting endpoints (e.g., based upon user input $D_{min}$ values, user input "zoom-out" penalty factors, number of video displays at a meeting endpoint vs. UHD video displays of the video feed content, other user desired factors at a meeting endpoint such as desired participants to always be displayed within an individual target view or combined target view, etc.). For example, the SCM algorithms can combine some or all of these factors in any suitable manner, e.g., by arithmetic operations such as multiplication and weighted summation, and/or utilizing logical decisions or based upon user input preferences. A simple combination, for example, may be the SCM algorithms setting the "zoom-out penalty" factor to 0, i.e., user preferring to see the most participants possible within the combined target view, and having no designated individual target view. In this example, the SCM algorithms may be simplified to a weighted summation of factors. The SCM algorithms can, e.g., utilize a weighted summation of factors (b) and (c) previously described herein, where the following SCM factor is applied based upon a factor such as:

SCM factor=$\alpha$*(Mean of HFEDs for all participants within an individual target view)−$\beta$*(standard deviation of HFEDs for all participants within an individual target view), where $\alpha>0$, $\beta>0$, and the values of $\alpha$ and $\beta$ can be user input values or determined empirically utilizing the target view processing application(s) 42.

The best combined target view, in this example, will be the one that has the most participants in the view and has the largest value of the SCM factor presented above.

Any other suitable factors can also be combined and utilized, based upon user preferences or experimental testing to determine which combined factors provide the best combined target views for given scenarios and given user requirements. A best combined target view can be determined by comparing different SCM factor calculations and implementing features associated with the SCM factor having the greatest value. Since the individual target views are cascaded to form the combined target view, each individual target view can be denoted by its upper-left corner coordinates with respect to the upper-left corner of a captured camera view most associated with the individual target view and its size (e.g., width and height dimensions). The process of determining a best target view can be achieved by searching within the combined camera view (i.e., the combination of the individual camera views) for a set of those parameters that give the highest scoring SCM factor.

The SCM algorithms can further relax the cascading constraint associated with combining individual target views, e.g., for scenarios in which the most possible meeting participants are desired while maintaining life-size proportions of the participants (i.e., not sacrificing participant size to include all participants in the combined target view). In such cases, it may be desirable to provide a break or gap in captured image content from the captured images 22 of the UHD cameras in order to sufficiently shift one or more individual target views in order to capture all desired meeting participants within a meeting room. Referring to FIG. 6, a combined target view 25-10 is depicted that cannot capture all participants (e.g., one participant is not within any individual target view 24). A decision may be made by the SCM algorithms, based upon user preferences determined for a meeting by one or more meeting endpoints, that the requirement for cascading of the individual target views to present a continuous display of captured image content across the combined target view can be relaxed, at least for a select period of time, in order to facilitate capture of the one or more participants not captured within any of the individual target views. As depicted in the combined target view 25-11 of FIG. 6, one of the individual target views 24 can be shifted (e.g., to the right as depicted in FIG. 6) so as to capture or encompass a participant not captured by the combined target view 25-10. This results in a gap in continuity of the combined captured image content by the UHD cameras of the cluster 10 within an ITP room 2, which is the cost for ensuring all participants can be displayed at life-size (e.g., without having to perform an electronic zoom-out using the EPTZ application(s) 38 which would result in an undesired proportional/dimensional size change to the participants).

An example embodiment in which the target view processing application(s) 42, utilizing the SCM algorithms and the EPTZ application(s) 38, incorporate electronic tilt features to generate individual and combined target views is described with reference to FIGS. 7A and 7B. Since meeting participants are typically in seated positions in an ITP room, electronic pan and zoom features are more likely to be used for "smart camera" operations to generate individual and combined target views based upon the location of participants within the ITP room. However, electronic tilt features may be needed at times when some participants are in standing positions, such that a standing participant's face is at a different, elevated position in a vertical coordinate of a view in relation to a seated participant's face. In the example embodiment of FIG. 7A, one participant 26-A in an individual target view 24-A is seated while another participant 26-B is standing in another individual target view 24-B.

Figure 7A:
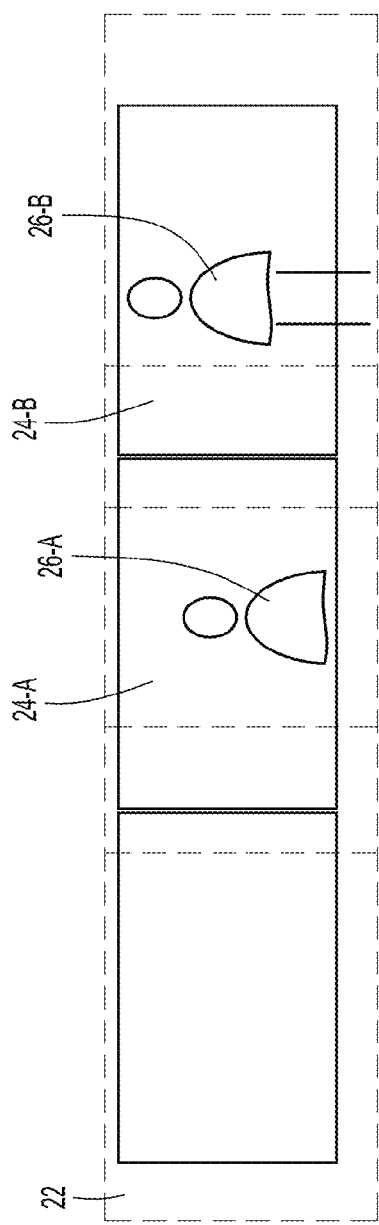
FIGS. 7A and 7B provide an example embodiment depicting target views within overlapping camera views in which adjustments to a target view can be made based upon positions of one or more participants (e.g., participant is seated or standing) within the target view in accordance with techniques as described herein.
Figure 7B:
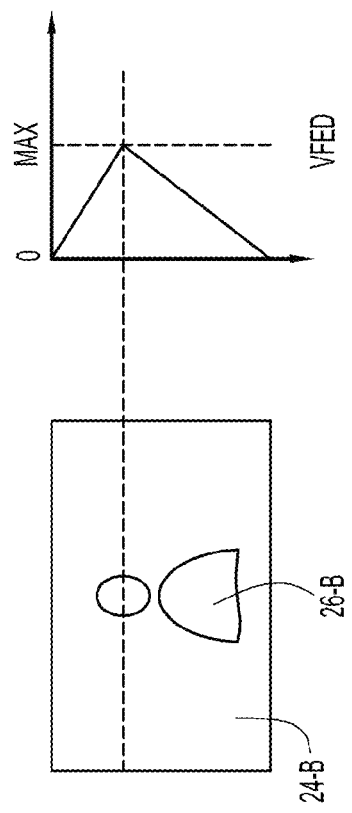

To determine a proper target view in a scenario such as depicted in FIG. 7A, SCM algorithms can be configured to incorporate factors for electronic tilt. For example, a Vertical Face-to-Edge Distance (VFED) may be defined and utilized by the SCM algorithms to measure the vertical position of a participant's face in an individual target view 24. However, because the most desired vertical position of a face is not necessarily at the center vertical coordinate location of a view, the VFED may be defined such that it has a maximum value when a participant's face is at some fraction of the height or vertical dimension (e.g., H1 dimension, as depicted in FIG. 2B), such as ⅔ of the height dimension associated with the individual target view (i.e., the vertical or height dimension of the display for the individual target view). Thus, the individual target view 24-B can be adjusted by electronically tilting the view (using EPTZ application(s) 38) such that the face of the participant 26-B is at ⅔ of the height or vertical dimension of the individual target view 24-B. Such tilting adjustment further ensures that the combined target view includes the faces of both the sitting participant 26-A (within individual target view 24-A) and the standing participant 26-B (with individual target view 24-B).

An example embodiment of operation of an ITP system comprising an ITP room 2 as depicted in FIG. 2 and an ITP server 30 as depicted in FIG. 3 is now described with reference to the flow chart of FIG. 8. An ITP meeting is initiated utilizing any conventional or other suitable software platforms and systems in which meeting endpoints are at different locations, at least some of which are configured as ITP rooms such as ITP room 2 depicted in FIG. 1. At 100, criteria associated with the ITP meeting is input (via a suitable input interface) to the ITP server 30 at the ITP room by one or more participants or a system administrator associated with the ITP room. Meeting criteria can be, e.g., a listing of one or more participants that should be displayed at all times during the meeting, preferences relating to dimensions of displayed views (e.g., the desire to maintain life-size or as close to life size as possible for participants throughout the meeting), zoom-out factors (e.g., indicating participant desire regarding whether to keep as many participants as possible within the combined target view), SCM factors as well as any other criteria that can be utilized by the server 30 to generate a combined target view from the captured camera views 22 during the ITP meeting. During the meeting, at 110 plurality of video images are captured by UHD video cameras at the cluster 10 within the ITP room 2. As previously noted herein, the UHD video cameras are arranged to capture views of video content, including participants seated at the table 4 in the ITP room 2, such that the FOVs of adjacent video cameras overlap. The ITP server 30 receives the video content captured by the UHD video cameras and, at 120, detects locations and positions (e.g., seating or standing participants) of participants within the ITP room 2 as well as identifying participants within the captured views utilizing the participant detection and target view processing applications 40, 42 as previously described herein. The detection of participants includes a detection of the outline for each participant (e.g., to determine whether any portion of a participant falls within overlapping FOVs of adjacent camera views) as well as a detection of participant faces within camera views (to facilitate determination of HFED and VFED values for participants). The detection and identification of participants within the camera views 22 also includes detection and identification of participants having any portions that are in overlapping FOVs of the camera views 22. In an example embodiment, all participants can be detected utilizing face detection software of the application(s) 40, and specific participants can also be detected utilizing face recognition software of the application(s) 40 (where the certain participants may be identified as required to be included in the combined target view).

At 130, the SCM algorithms are applied to the video content, utilizing the target view processing application(s) 42, and any electronic pan, tilt and/or zoom operations (utilizing the EPTZ application(s) 38) can be performed to determine the best combined target view based upon the captured camera views 22, including identified participants of interest at the desired proportions/dimensions (e.g., life-sized) utilizing the criteria and techniques as previously described herein. At 140, individual target views 24 are generated based upon the determined best combined target view so as to render a combined target view 25 at the display(s) of other meeting endpoints.

Individual target views can be modified as necessary by the ITP server 30, utilizing the target view processing application(s) 42 and the determined best combined target view, and based upon any changes that are detected during the meeting, such as movements of participants within the ITP room 2, a participant changing from a seated position to a standing position or vice versa, a speaker in the meeting changing from one participant to another, etc.

Thus, the systems and techniques described herein implement smart camera features that enhance immersive Telepresence (ITP) by automatically generating views for display that capture participants at desired proportional dimensions without restricting movements of participants within an ITP room (e.g., no need for the use of knee locker structures or any other structures that restrict movements of participants) during a meeting.

In addition, while the example embodiments described herein depict an ITP server 30 at the video content origination end generating the individual target views based upon SCM algorithms, it is noted that any suitable server or other computing device at any location can generate the individual target views based upon SCM algorithms and based upon the video content captured by a plurality of video cameras. For example, the processing of video content from the UHD video cameras within the ITP room 1 can be achieved by another ITP server or computing device located at another meeting endpoint, where the video content captured within the ITP room 1 is provided to the other meeting endpoint. Meeting endpoints comprising remote participants utilizing a single display (e.g., a laptop, tablet, etc.) can also process the video content in similar manner received from the meeting endpoint comprising the ITP room 1.

The above description is intended by way of example only.

What is claimed is:

1. A method comprising:
   receiving at a computing device video content comprising a plurality of camera views provided by a plurality of video cameras that are aligned to capture images of participants within a defined space, wherein the video cameras are aligned such that a field of view (FOV) for each camera overlaps a portion of the FOV of at least one other adjacent camera;
   detecting, by the computing device, positions of a plurality of participants depicted within the video content;

determining, by the computing device, a combined target view to be displayed at a plurality of display devices associated with the computing device and that includes the plurality of detected participants, the combined target view being determined based upon a defined region of interest (ROI) associated with one or more of the camera views, wherein the defined ROI comprises at least one participant captured within overlapping FOVs of two adjacent camera views;

generating, by the computing device, a plurality of target views from the camera views that combine to form a continuous view of video content defining the combined target view; and displaying the plurality of target views at a corresponding plurality of display devices.

2. The method of claim 1, wherein the generating the target views further comprises:

utilizing the computing device, applying electronic pan, zoom and tilt (EPTZ) features to the camera views so as to include the at least one defined ROI within the combined target view.

3. The method of claim 2, wherein the generating the target views further comprises:

detecting faces of participants within the camera views; and generating target views within one or more camera views utilizing the EPTZ features applied by the computing device to define target views such that a detected face of at least one participant has a horizontal face to target view edge distance (HFED) value that is greater than a minimum threshold value.

4. The method of claim 3, wherein target views are further defined based upon one or more of the following criteria: the detected face of each participant has a HFED value that is greater than the minimum threshold value, a mean of HFED values of all detected faces of participants is greater than a mean threshold value, and a variation of a HFED value for a detected face of each participant from a set value is less than a variation threshold value.

5. The method of claim 2, wherein the generating the target views further comprises:

generating target views within one or more camera views utilizing the EPTZ features applied by the computing device to define target views such that the detected participants are at predetermined dimensions within the target views.

6. The method of claim 5, wherein target views are further defined based upon a criteria that reduces a size dimension of the detected participants within the defined target views to facilitate viewing of all participants within the defined target views.

7. The method of claim 2, wherein the generating the target views further comprises:

generating target views within one or more camera views utilizing the EPTZ features applied by the computing device to define target views such that the detected faces of at least two participants that are located at different vertical dimensions within one or more target views are captured within the combined target view.

8. The method of claim 2, wherein the generating the target views further comprises:

identifying, by the computing device, one or more specified participants within the camera views based upon the detected faces of participants;

wherein the ROI within the combined target view includes the one or more identified participants.

9. An apparatus comprising:

a plurality of video cameras aligned to capture video content comprising a plurality of camera views, wherein the camera views comprise images of participants within a defined space, and the video cameras are aligned such that a field of view (FOV) for each camera overlaps a portion of the FOV of at least one other adjacent camera;

at least one display device to display a portion of video content captured by the video cameras, wherein the video content comprises the camera views;

a memory configured to store instructions including one or more applications that process video content captured by the video cameras for display by the at least one display device; and a processor configured to execute and control operations of the one or more applications so as to:

detect positions of a plurality of participants depicted within the video content;

determine a combined target view to be displayed at a plurality of display devices, the combined target view being determined based upon a defined region of interest (ROI) associated with one or more of the camera views, wherein the defined ROI comprises at least one participant captured within overlapping FOVs of two adjacent camera views;

generate a plurality of target views that combine to form a continuous view of video content defining the combined target view; and display the plurality of target views at the display devices.

10. The apparatus of claim 9, wherein the processor further generates the second number of target views by:

applying electronic pan, zoom and tilt (EPTZ) features to the camera views so as to include the at least one defined ROI within the combined target view.

11. The apparatus of claim 10, wherein the processor further generates the target views by:

detecting faces of participants within the camera views; and generating target views within one or more camera views utilizing the EPTZ features to define target views such that a detected face of at least one participant has a horizontal face to target view edge distance (HFED) value that is greater than a minimum threshold value.

12. The apparatus of claim 11, wherein the processor generates target views so as to define target views based upon one or more of the following criteria: the detected face of each participant has a HFED value that is greater than the minimum threshold value, a mean of HFED values of all detected faces of participants is greater than a mean threshold value, and a variation of a HFED value for a detected face of each participant from a set value is less than a variation threshold value.

13. The apparatus of claim 10, wherein the processor further generates the target views by:

generating target views within one or more camera views utilizing the EPTZ features to define target views such that the detected participants are at predetermined dimensions within the target views.

14. The apparatus of claim 13, wherein the processor generates target views such that the target views are defined based upon a criteria that reduces a size dimension of the detected participants within the defined target views to facilitate viewing of all participants within the defined target views.

15. The apparatus of claim 10, wherein the processor further generates the target views by:
   generating target views within one or more camera views utilizing the EPTZ features to define target views such that the detected faces of at least two participants that are located at different vertical dimensions within one or more target views are captured within the combined target view.

16. One or more memory storage devices encoded with software comprising computer executable instructions and when the software is executed operable to:
   receive at a computing device video content comprising a plurality of camera views provided by a plurality of video cameras that are aligned to capture images of participants within a defined space, wherein the video cameras are aligned such that a field of view (FOV) for each camera overlaps a portion of the FOV of at least one other adjacent camera;
   detect positions of a plurality of participants depicted within the video content;
   determine a combined target view to be displayed at a plurality of display devices, the combined target view being determined based upon a defined region of interest (ROI) associated with one or more of the camera views, wherein the defined ROI comprises at least one participant captured within overlapping FOVs of two adjacent camera views;
   generate a plurality of target views that combine to form a continuous view of video content defining the combined target view; and
   display the plurality of target views at a corresponding plurality of display devices.

17. The one or more memory storage devices of claim 16, wherein the instructions generate the target views by:
   applying electronic pan, zoom and tilt (EPTZ) features to the camera views so as to include the at least one defined ROI within the combined target view.

18. The one or more memory storage devices of claim 17, wherein the instructions generate the target views by:
   detecting faces of participants within the camera views; and
   generating target views within one or more camera views utilizing the EPTZ features to define target views such that a detected face of at least one participant has a horizontal face to target view edge distance (HFED) value that is greater than a minimum threshold value.

19. The one or more memory storage devices of claim 18, wherein instructions generate the target such that the target view are defined based upon one or more of the following criteria: the detected face of each participant has a HFED value that is greater than the minimum threshold value, a mean of HFED values of all detected faces of participants is greater than a mean threshold value, and a variation of a HFED value for a detected face of each participant from a set value is less than a variation threshold value.

20. The one or more memory storage devices of claim 18, wherein the instructions generate the target views by:
   generating target views within one or more camera views utilizing the EPTZ features to define target views such that the detected participants are at predetermined dimensions within the target views.

21. The one or more memory storage devices of claim 20, wherein the instructions generate the target views such that the target views are defined based upon a criteria that reduces a size dimension of the detected participants within the defined target views to facilitate viewing of all participants within the defined target views.

22. The one or more memory storage devices of claim 17, wherein the instructions generate the target views by:
   generating target views within one or more camera views utilizing the EPTZ features to define target views such that the detected faces of at least two participants that are located at different vertical dimensions within one or more target views are captured within the combined target view.

* * * * *